June 19, 1945. E. C. MYERS 2,378,427
FLEXIBLE TRACK
Filed May 14, 1941 3 Sheets-Sheet 1
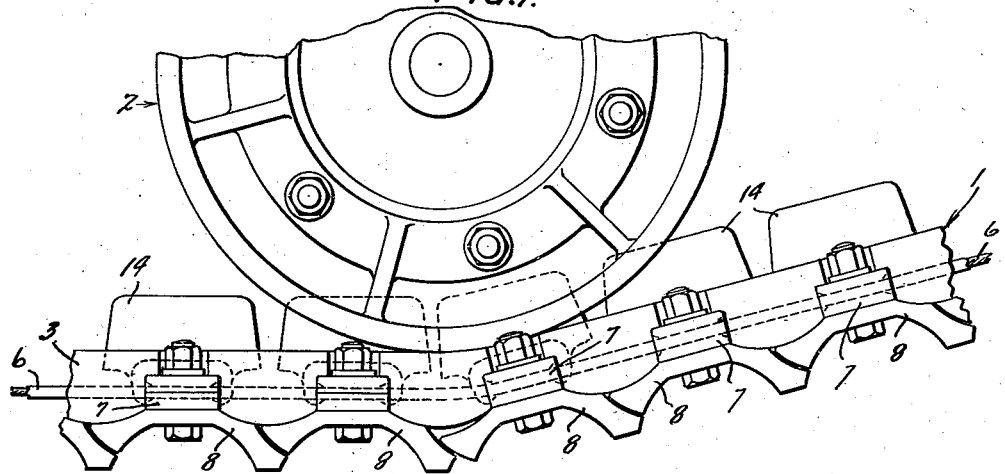
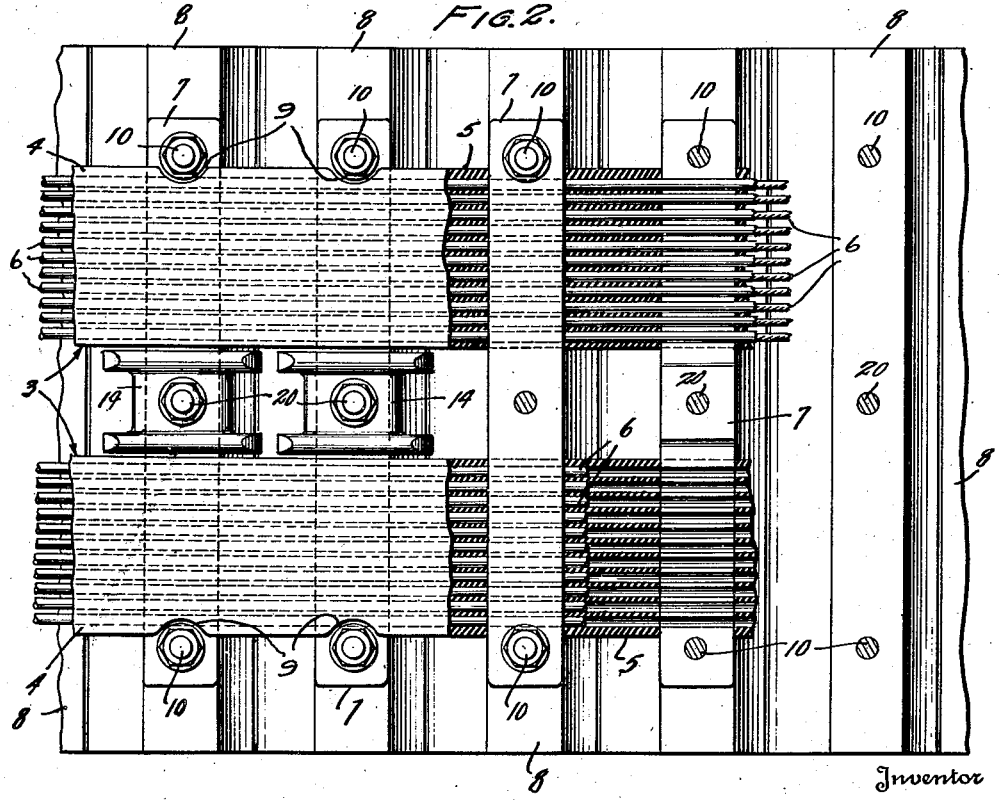
Inventor
EDWARD C. MYERS
By Semmes, Keegin, Beale & Semmes
Attorneys June 19, 1945.  E. C. MYERS  2,378,427
FLEXIBLE TRACK
Filed May 14, 1941  3 Sheets-Sheet 2
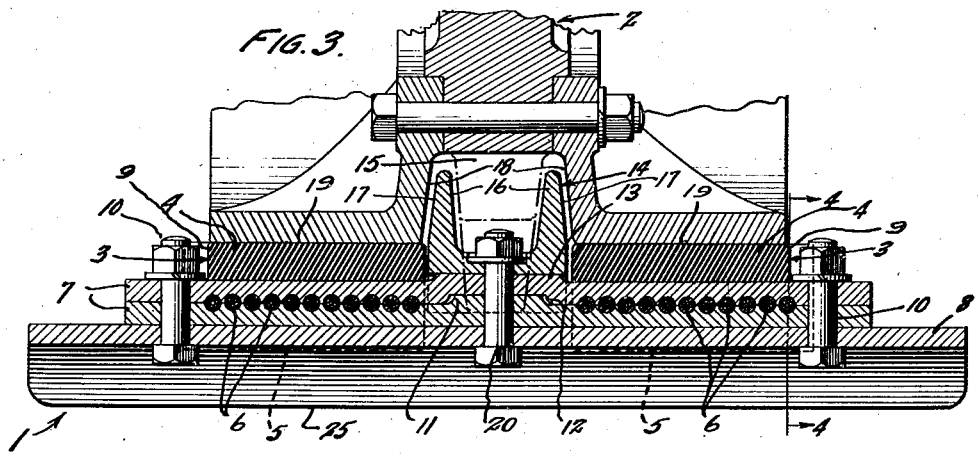
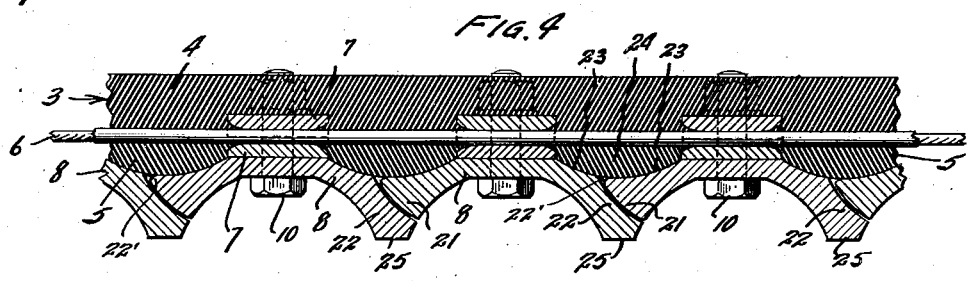
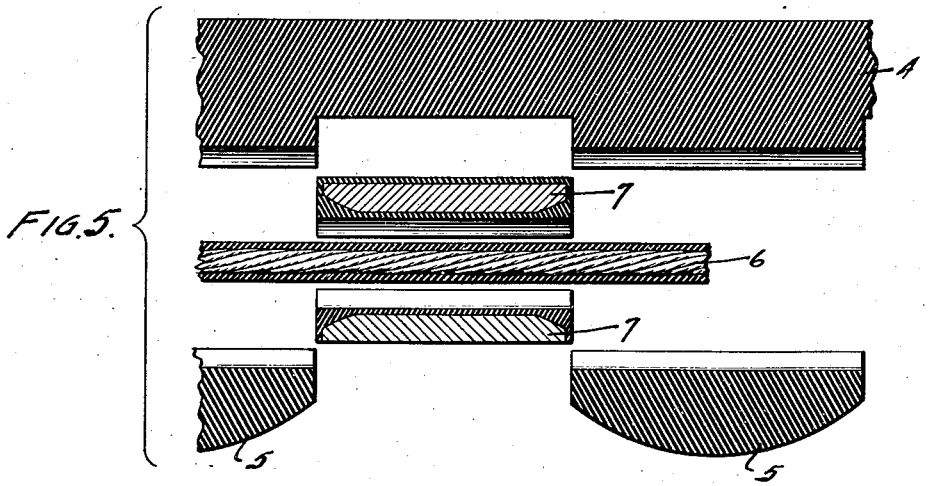
Inventor
EDWARD C. MYERS
By Semmes Keegin Beale & Semmes
Attorneys

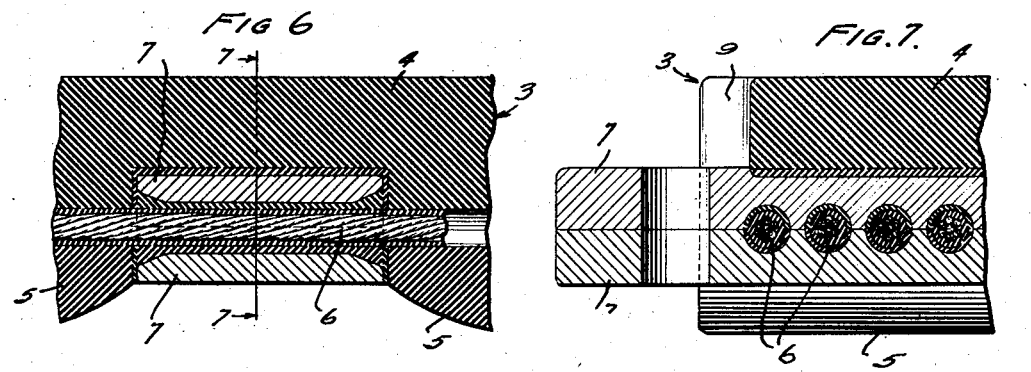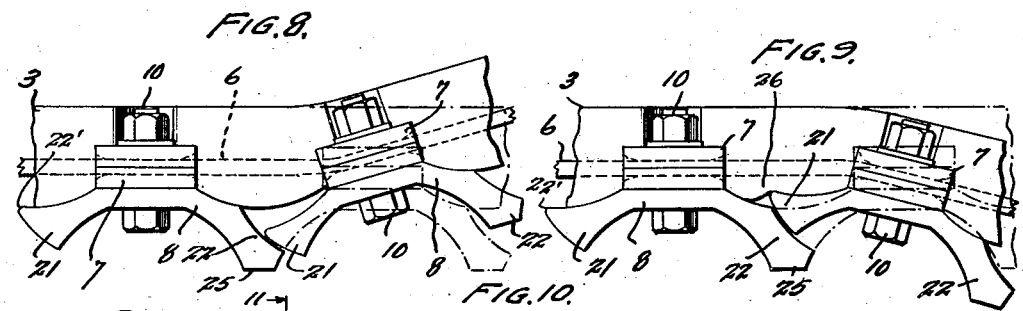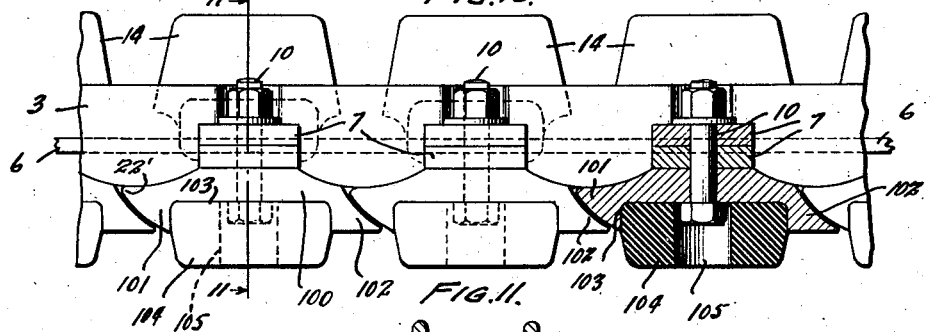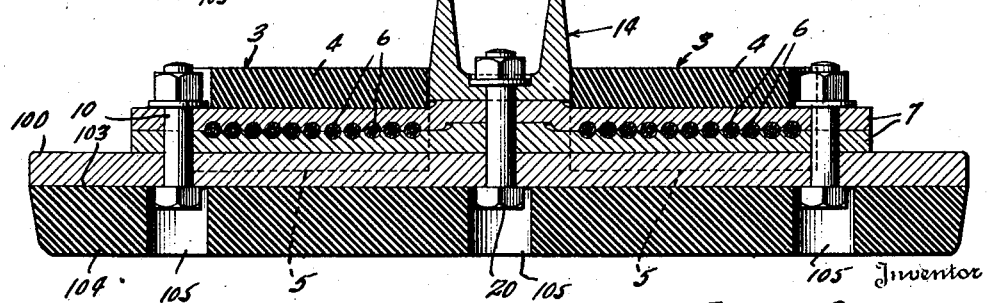
Inventor
EDWARD C. MYERS

Patented June 19, 1945

2,378,427

UNITED STATES PATENT OFFICE 2,378,427

FLEXIBLE TRACK

Edward C. Myers, Racine, Wis.

Application May 14, 1941, Serial No. 393,461

9 Claims. (Cl. 305—10)

This invention relates to flexible tracks, and in particular is of utility in connection with flexible tracks used on endless track vehicles, though the invention has other applications.

Among other uses, the construction of my present invention is of great advantage in the case of heavy machinery where great weight is carried by the track and high speeds are employed; conditions such as exist with large earth hauling vehicles and tanks in combat.

My invention in which I utilize a substantially continuous surface formed by contact members closely adjacent each other mounted on a flexible track, gives some of the advantages of the short link type of track heretofore used, with the continuity and lack of friction of the flexible continuous track, together with its strength and durability.

In general it can be said that link tracks are not useful at high speeds since high initial tension cannot be employed with a jointed track. This high initial tension is necessary to prevent loss of the track, and in particular to prevent the track from riding out on the sprocket due to the centrifugal forces generated at high speeds. A cable type track will permit high tension and prevent loss of the track, the track, because of its high tension, being prevented from riding out on the sprocket teeth.

With a rubber covered cable track under heavy duty, the portion of the track in contact with the ground is subjected to great wear. The substantially continuous plate covering of the present form of device which is the subject matter of this invention, in combination with the flexible cable type track is a construction which has inherently excellent characteristics.

The substantially continuous plate protection afforded by the closely adjacent ground contact members prevents wear, flexing and injury of the track when the track is subjected to heavy loads and is driven over ground such as is presented by sharp rocks.

The present invention by reason of the driving and guiding contact member construction presents a simple easy method of driving the track, and preventing kinking of the track between rollers, or riding of the track off of the idler rollers or the sprocket.

By reason of the fact that I can construct the ground contact members wider than the flexible body construction, I can use the body construction which is wide enough to stand the loads, but the tread surface presented can be as wide as desired for soft ground. The almost continuous plate construction prevents undue lateral flexing and consequent deterioration of the track. I employ removable ground contact members and this enables the track to be cheaply repaired and replaced.

Another object of the invention is to provide ground contact members so constructed as to prevent binding in either direction of flexing, as well as to prevent dirt or gravel getting between the ground contact members.

In one form of my invention the ground contact members themselves can be rubber coated for easy riding qualities and to prevent damage to roadways.

Figure 1 is a detail view in side elevation of a portion of my track passing over an idler wheel;

Fig. 2 is a top plan view of the track, portions of the construction being broken away to more clearly illustrate the position of the parts;

Fig. 3 is a sectional view taken through the track;

Fig. 4 is a view taken along the line 4—4 of Fig. 3, looking in the direction of the arrows;

Fig. 5 is an exploded view showing the method of assembly of the track;

Fig. 6 is a detail sectional view showing the track after assembly;

Fig. 7 is a view taken along the line 7—7 of Fig. 6 looking in the direction of the arrows;

Fig. 8 is a detail view, portions of the track being broken away, and portions dotted in to show the position of the parts when the track is bent in one direction;

Fig. 9 is a view similar to the view shown in Fig. 8 showing the position of the parts when the track is bent in the opposite direction;

Fig. 10 is a detail view partly in section showing a modification of my track in which the ground contact members are provided with rubber facings;

Fig. 11 is a view taken along the line 11—11 of Fig. 10, looking in the direction of the arrows.

Referring to the drawings, I have shown a track illustrated generally by the numeral 1 as passing over an idler wheel indicated generally by the numeral 2. The track 1 comprises a pair of endless flexible rubber bodies 3 having an upper portion 4 and a lower portion 5. Embedded in the body are flexible metallic cables, such as steel cables 6, which are at intervals clamped between steel cross plates 7. Mounted adjacent each pair of cross plates 7 is a ground contact member 8.

The outer edge of the upper portion 4 of the flexible body 3 is indented, as indicated at 9, and at the point of indentation bolts 10 are adapted to pass through the pairs of cross plates 7 and hold them firmly together, as well as to hold each of the ground contact members 8 firmly to the cross plates 7.

The flexible body 3 may be of rubber or similar composition, and the method of assembly is illustrated in Figs. 5 and 6. Each half of a cross plate 7 is coated with a rubber compound, as indicated in Fig. 5, and the rubber compound is at least partially vulcanized in place. Each flexible cable 6 is likewise coated with a rubber-like compound and this is vulcanized in place. The rubber compound passes in between the strands of each flexible cable 6 and at least partially covers each of the strands. When the covering of each pair of cross plates 7 is completed and the cables have been likewise covered the assembly is made as indicated in Fig. 6 and the whole is then vulcanized in place. The vulcanization of the rubber-like material on the flexible cables 6 and the halves 7 of the cross plates does not have to be a complete vulcanization and the vulcanization process can be completed when the whole assembly is firmly vulcanized.

Though I have indicated in Fig. 6 that after the assembly there is a difference between the different coatings of the parts of the assembly, it is to be understood that in actual practice after the assembly is made the rubber assumes a continuity around all of the embedded parts.

The upper plate 7 of each of the pairs of plates is provided with a recess 11 in its center into which is adapted to extend a projection 12 of the lower adjacent plate of the pair. This is to assist in assembly of the parts and to assist in holding the pairs of plates firmly together. The rubber covered cables 6 are adapted to lie in annular recesses formed through the line of juncture of the pairs of plates 7. The upper half of each of the pairs of plates 7 is provided with a projection 13 on which is adapted to be mounted a U-shaped drive and guide contact member 14, through which the track is driven and by which it is guided and held in place on the vehicle.

For instance, each idler wheel 2 of which only one is shown has a recess 15 formed in its central periphery, and the upstanding elements 16 of the U-shaped drive and guide contact members 14 project within this space 15. It is to be noted that each of the upstanding members 16 of each drive and guide contact member 14 is provided with a sloped outer surface, as indicated at 17, which is adapted to lie adjacent a sloped surface 18 formed on the inside of the idler wheel 2. In dotted lines is shown the position of the teeth provided on the drive sprocket (not shown) which are adapted to engage the longitudinal ends 14' of the members 14 to impart motion to the track. Each idler wheel 2 is provided with a tread surface 19 which is adapted to bear against the upper surface of the upper portion 4 of the body 3, and the track in this manner bears the weight of the vehicle. It is to be understood of course that there may be a number of idlers spaced along the track to carry the weight, though for the purpose of illustration only one such idler has been illustrated.

To hold the drive and guide contact members 14 in position, I have provided a bolt 20 which is adapted to pass through the metallic cross plates 7 and through the ground contact shoes 8 (see Figs. 3 and 4).

By reason of the construction shown, it is possible to have the flexible body as large as is necessary to take the weight, but at the same time the ground contact shoes 8 may be made as wide as necessary to take care of the condition of the terrain. For instance, in soft ground the contact members 8 may be made considerably wider than the flexible body 3.

Each of the ground contact shoes 8 has one end convex, as illustrated at 21, and the other end is concave, as illustrated at 22. Each of the ends 21 and 22 are adapted to project in a downwardly extending curvature. This permits the upper portions of adjacent ends of ground contact shoes 8 to form concave surfaces, as indicated at 23, into which are adapted to project convex sections 24 of the lower portion 5 of the flexible body 3. Each of the ground contact elements in the form shown is integrally constructed with the ground contact shoe 8 and adjacent the concave surface 22 formed on the shoe. The almost continuous ground contact shoes form a type of plate construction which gives great lateral stability and prevents lateral flexing of the flexible track and consequent wear. The ends 21 have rounded upper lateral edges that permit the track to flex readily without injury to the rubber.

Referring more particularly to Figs. 8 and 9, the action of the construction when the track is flexed can be easily seen. The mounting of the plates is such, and the convex curvature 21 of the ends and the concave curvature 22 of the ends is such as to permit the surface 21 to pass by the surface 22, as illustrated for instance in Fig. 8, without materially changing the distance between the surfaces. Such action takes place when the track is flexed, as shown in Figure 8. Thus accumulation of dirt and gravel between the surfaces 21 and 22 is minimized. This particular construction is of great advantage in gritty soil since contact plates which are merely mounted adjacent each other without provision for the movement of one surface past the other will when flexed as illustrated in Fig. 8 open up spaces between the contact plates which will then close on grit or gravel and subject the parts to considerable strain.

In like manner, when the track is flexed in the opposite direction similar phenomena take place. That is to say, convex surface 21 of one end of the ground contact shoe 8 passes by the concave surface 22 of the adjacent ground contact shoe 8. The relatively thick bulge of resilient material presented by the lower surface 5 of the flexible track 3 at a point midway between contact shoes 8 permits a considerable degree of compression of the rubber at this point since rubber is relatively thick at this point. Thus injury to the track is minimized. Reference is here made to Fig. 9 and attention is called to the compression, as indicated at point 26. Here again, because of the location, size and degree of curvatures of the ends of the ground contact shoes 8, the flexing of the track in the direction illustrated in Fig. 9 does not cause binding between the adjacent ends of the ground contact shoes, nor does the distance between the ends greatly increase or decrease during flexing with the attendant advantages which have been set forth in detail in connection with the description of the flexing of the track in the direction illustrated in Fig. 8.

In Figs. 10 and 11 there is shown a form of track in which the ground contact shoes are of somewhat different construction from those just described. In this form of construction the ground contact shoes have been indicated by the numeral 100. Each ground contact shoe is provided with an end 101 having a convex surface and an end 102 having a concave surface. The end having the concave surface 102 does not, however, have any ground engaging surface. However, each ground contact shoe 100 is provided with a recess 103 in which is adapted to be held a rubber facing block 104 which may be vulcanized in place in each ground contact shoe 100, or otherwise suitably attached. Apertures 105 are provided in the rubber facing elements 104 for the heads of the bolts 10 and 20 so that the ground contact shoes 100 can be removed and replaced and the track can be disassembled.

In this form of construction the operation of the ground contact members 100 in their movement past each other in either direction of flexing is the same as that described in connection with ground contact elements 8, but the rubber surface presented by the cushioning elements 104 makes for easy riding and prevents damage to the roadway.

Other forms of my invention than those illustrated will be apparent to those skilled in the art. I do not wish to be limited merely to the forms shown herein by way of illustration.

I claim:

1. A surface for a flexible track comprising ground contact members mounted adjacent to each other on the track and having end faces adapted to lie near each other without touching, the end faces being so shaped as to move past each other on flexing of the track in either direction without substantially varying the spacing between adjacent end faces of adjacent contact members.

2. A vehicle track comprising a flexible track, ground contact members adapted to lie adjacent to each other, means securing said members intermediate their ends to said flexible track, each member having one concave shaped end face and one convex shaped end face, the convex end face of one member lying adjacent the concave end face of the next member the convex end surface of each member having its center of curvature lying in a point of attachment of the member to the flexible track, and the concave end surface of each member having its center of curvature coinciding with the center of curvature of the cooperating convex end surface of an adjacent member.

3. A flexible track having a body comprising flexible cables and a resilient covering on the cables, and ground contact members mounted on the body adapted to lie adjacent each other, each member having one concave shaped end face and one convex shaped end face, the convex end face of one member lying adjacent the concave end face of the next member the convex end surface of each member having its center of curvature lying in a point of attachment of the member to the flexible track, and the concave end surface of each member having its center of curvature coinciding with the center of curvature of the cooperating convex end surface of an adjacent member so that the end surfaces of adjacent members may move relative to each other without varying the spacing between them.

4. A resilient surface for a flexible track comprising ground contact members mounted adjacent to each other on the track and having ends adapted to lie near each other without touching, the ends being so shaped as to move past each other on flexing of the track in either direction without substantially varying the spacing between adjacent ends, each ground contact member carrying a resilient element.

5. Resilient surfaced ground contact members for a flexible track adapted to lie adjacent each other, each member having one concave shaped end and one convex shaped end, the convex end of one member lying adjacent the concave end of the next member, each contact member being provided with a recess and a resilient element carried in the recess the convex end surface of each member having its center of curvature lying in a point of attachment of the member to the flexible track, and the concave end surface of each member having its center of curvature coinciding with the center of curvature of the cooperating convex end surface of an adjacent member so that the end surfaces of adjacent members may move relative to each other without varying the spacing between them.

6. A flexible track for endless track vehicles comprising flexible cables, a plurality of pairs of plates spaced longitudinally of the cables, the plates of each pair lying on opposite sides of the cables, metal tread members, means for securing the plates of each pair and a tread member together and to the cables, and a resilient body covering the cables and pairs of plates, each tread member having a concave shaped end and an opposite convex shaped end, the convex end of one member lying adjacent and in cooperation with the concave end of an adjacent tread member, the convex end surface of each member having its center of curvature lying substantially in a line extending transversely through the cables and lying in a plane containing the adjacent end faces of the pairs of plates, and the concave end surfaces of the members having their centers of curvature coinciding with the centers of the curvature of the cooperating convex end surfaces of adjacent tread members.

7. A flexible track for endless vehicles comprising flexible cables, a plurality of pairs of plates spaced longitudinally of the cables, the plates of each pair lying on opposite sides of the cables, metal tread members, means for securing the plates of each pair and a tread member together and to the cables, and a resilient body covering the cables and pairs of plates, each tread member having a concave shaped end and an opposite convex shaped end, the convex end of one member lying adjacent and in cooperation with the concave end of an adjacent tread member, the convex end surface of each member having its center of curvature lying substantially in a line extending transversely through the cables and lying in a plane containing the adjacent end faces of the pairs of plates, and the concave end surfaces of the members having their centers of curvature coinciding with the centers of curvature of the cooperating convex end surfaces of adjacent tread members, said resilient body having resilient portions extending between adjacent pairs of plates into engagement with the upper surfaces of the tread members to form buffers for said tread members.

8. A vehicle track comprising an endless flexible member formed of flexible cables and a body of resilient material in which the cables are embedded, ground contact members secured intermediate their ends to said endless flexible member at spaced intervals, said ground contact members on the surface thereof facing the resilient body curving concavely away from the flexible cables from the zone of attachment to the endless flexible member toward the ends thereof, the resilient body having resilient projections on its outer face intermediate the zones of attachment of the ground contacting members extending into the spaces provided by concavely curved surfaces of adjacent ends of juxtaposed ground contact members.

9. A vehicle track comprising a flexible track, ground contact members mounted adjacent each other intermediate their ends on the outer surface of the track and having end faces adapted to lie near each other without touching, the end faces being so shaped as to move past each other on flexing of the track in either direction without substantially varying the spacing between adjacent end faces of adjacent contact members, the surface of each ground contacting member facing the track being concave and curving away from the track between the intermediate portion thereof and the ends thereof, the concave surfaces on adjacent portions of juxtaposed ground contacting members cooperating to form pockets, and projections of resilient material carried by the outer surface of said track, filling said pockets.

EDWARD C. MYERS.